United States Patent [19]

Dorsel et al.

[11] Patent Number: 5,077,813
[45] Date of Patent: Dec. 31, 1991

[54] OPTICAL SWITCH

[75] Inventors: Andreas Dorsel, Aalen; Gerhard Hohberg, Aalen-Dewangen; Wilfried Walch, Aalen, all of Fed. Rep. of Germany

[73] Assignee: Carl-Zeiss-Stiftung, Heidenheim, Fed. Rep. of Germany

[21] Appl. No.: 688,098

[22] Filed: Apr. 19, 1991

[30] Foreign Application Priority Data

Apr. 25, 1990 [DE] Fed. Rep. of Germany ... 9004633[U]

[51] Int. Cl.$^5$ ........................... G02B 6/32; G02B 6/10
[52] U.S. Cl. .......................................... 385/19; 385/33
[58] Field of Search ..... 350/96.13, 96.15, 96.18–96.21

[56] References Cited

U.S. PATENT DOCUMENTS

| 3,912,391 | 10/1975 | Fleisher et al. | 350/3.75 |
| 4,076,420 | 2/1978 | Maeyer et al. | 356/73 |
| 4,707,838 | 11/1987 | Reule et al. | 372/38 |
| 4,753,510 | 6/1988 | Sezerman | 350/96.21 |

FOREIGN PATENT DOCUMENTS 3232445 3/1984 Fed. Rep. of Germany .
3431997 3/1986 Fed. Rep. of Germany .

OTHER PUBLICATIONS

"Applications of GRIN-Rod Lenses in Optical Fiber Communication Systems", by W. J. Tomlinson in Applied Optics, vol. 19, No. 7, Apr. 1, 1980.

Primary Examiner—Akm Ullah
Attorney, Agent, or Firm—Walter Ottesen

[57] ABSTRACT

The invention is directed to an optical switch for a sensor. The optical switch conducts radiation emitted from a radiation source into a fiber leading to the sensor and conducts radiation returning from this fiber onto an optoelectric receiver. The optical switch includes a filter having wavelength-dependent transmission and reflection characteristics as well as optical components for collimating or focusing. The optical components together with the filter define a component unit in the form of an acute angle optical switch. The optical switch also has a first beam splitter mounted downstream of the component for collimating the radiation emitted by the radiation source. The beam splitter splits off a component of the radiation emitted by the radiation source as a reference beam and the reference beam is guided via deflecting prisms and spacers to a second beam splitter. The second beam splitter geometrically superposes the reference beam onto the measurement beam returning from the fiber via the optical switch. An air gap is provided ahead of the second beam splitter for accommodating a movable diaphragm therein which alternately interrupts the measurement beam or the reference beam.

15 Claims, 2 Drawing Sheets

OPTICAL SWITCH

FIELD OF THE INVENTION

The invention relates to an optical switch, preferably for a fiber-optic sensor with the sensor preferably being a fiber-optic sensor.

BACKGROUND OF THE INVENTION

In fiber-optic sensors, it is often advantageous to conduct the radiation traveling to the sensor head and the radiation returning from the sensor head through one and the same fiber. This corresponds to the duplex method (bidirectional transmission) known from communications technology wherein information is transmitted through a fiber in both directions.

An assembly suitable for fiber-optic sensors for coupling the radiation of a radiation source into a fiber and for conducting the returning radiation to a receiver is disclosed, for example, in published German patent application DE-OS 3,431,997. A suitable arrangement having a reference receiver is described in U.S. Pat. No. 4,707,838 for the control of the radiation emitted by a light-emitting diode and for its control. Such arrangements utilize a conventional optical assembly having normal lenses and dichroic layers on plane-parallel plates for deflecting beams in dependence upon wavelength. These arrangements have the disadvantage that they require a complex assembly because of the necessary mounting of their individual elements. In addition, the adjustment of these arrangements is complicated and they are poorly suited for miniaturization. This applies especially for more complex arrangements, for example, when a returning beam and intermittently a reference beam are to impinge on the same receiver.

An optical switch for transmitting information in two directions through a fiber in the so-called wavelength multiplex method is known from German Patent 3,232,445. This optical switch comprises a plurality of mutually abutting graded index rod lenses (GRIN-lenses) and filters and the receiver is mounted at one end thereof. On the opposite-lying end face of the other end, a fiber for information transmission is connected as well as a fiber which leads to a semiconductor transmitter. The filters operate as reflection filters for the radiation of the semiconductor sensor so that the radiation reaches the fibers for transmitting information. The incoming radiation of the information transmission has, however, a wavelength which the filter passes so that the radiation arrives at the receiver.

This solution provided for the transmission of information has the disadvantage that the fibers do not seat coaxially on the end face of the first GRIN-lens. This not only means a greater production cost but also a compromise between a greater cross coupling between the fibers (with decreasing spacing of the fibers) and deteriorating imaging characteristics of the GRIN-lenses (with increasing spacing of the fibers) and greater losses caused thereby. This known solution is therefore not suitable for fiber-optic sensors wherein the returning radiation is considerably less than the radiation traveling to the sensor head.

A multiplexer is known from an article of W. J. Tomlinson entitled "Applications of GRIN-rod lenses in optical fiber communication systems", Applied Optics, Vol. 19, No. 7, Apr. 1, 1980 wherein the radiation supplied via a row of fibers is conducted with different wavelengths into a common fiber. The fibers are coupled to a plane-parallel plate via , GRIN-lenses and prisms and suitable filters are mounted on both surfaces of the plane-parallel plate. The optical axes of the beams define equal acute angles to the normal on the plate surfaces and, with each reflection at a filter, the radiation is joined with the radiation admitted by this filter into the plane-parallel plate.

If this arrangement is reduced to two wavelengths, then an acute angle switch having a filter results which passes the one wavelength and reflects the other wavelength. An optical switch of this kind would be suitable for a fiber-optic sensor but has the disadvantage that it is not suitable for sensors wherein a reference beam path is necessary with which the radiation of the radiation source can be intermittently conducted directly onto the receiver.

SUMMARY OF THE INVENTION

In view of the foregoing, it is an object of the invention to provide an optical switch which has a reference beam path and is as compact as possible.

In optical switches, it is necessary for fiber sensors that there be negligible influence from side-to-side coupling or cross-coupling of the radiation traveling from the radiation source to the sensor head (transmission channel) on the signal of the radiation traveling from the sensor head to the receiver (receiving channel). Accordingly, it is another object of the invention to provide an optical switch wherein this influence on the signal coming from the sensor head is indeed negligible.

In an advantageous embodiment, the radiation source is included in a compact assembly of the optical switch and is connected to the first optical component thereof via a relatively short fiber piece which is at least so long that the aperture of the radiation passing from its end is limited. With an adequate length of this fiber piece, it functions as a field stop (because of its cross section) and at the same time as an aperture diaphragm (by means of the refractive index of the core and cladding). At its end, the fiber piece limits the aperture as well as the lateral expansion of the radiating surface and, in this way, effects the condition that, in the following optical components, only a reduced portion of the radiation has an unwanted and disturbing run and effects side-to-side coupling and therewith influences the measurement.

In a further advantageous embodiment of the development, the fiber piece is seated in a hollow body which has plane-parallel end faces and which connects the radiation source with the first component of the optical switch.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
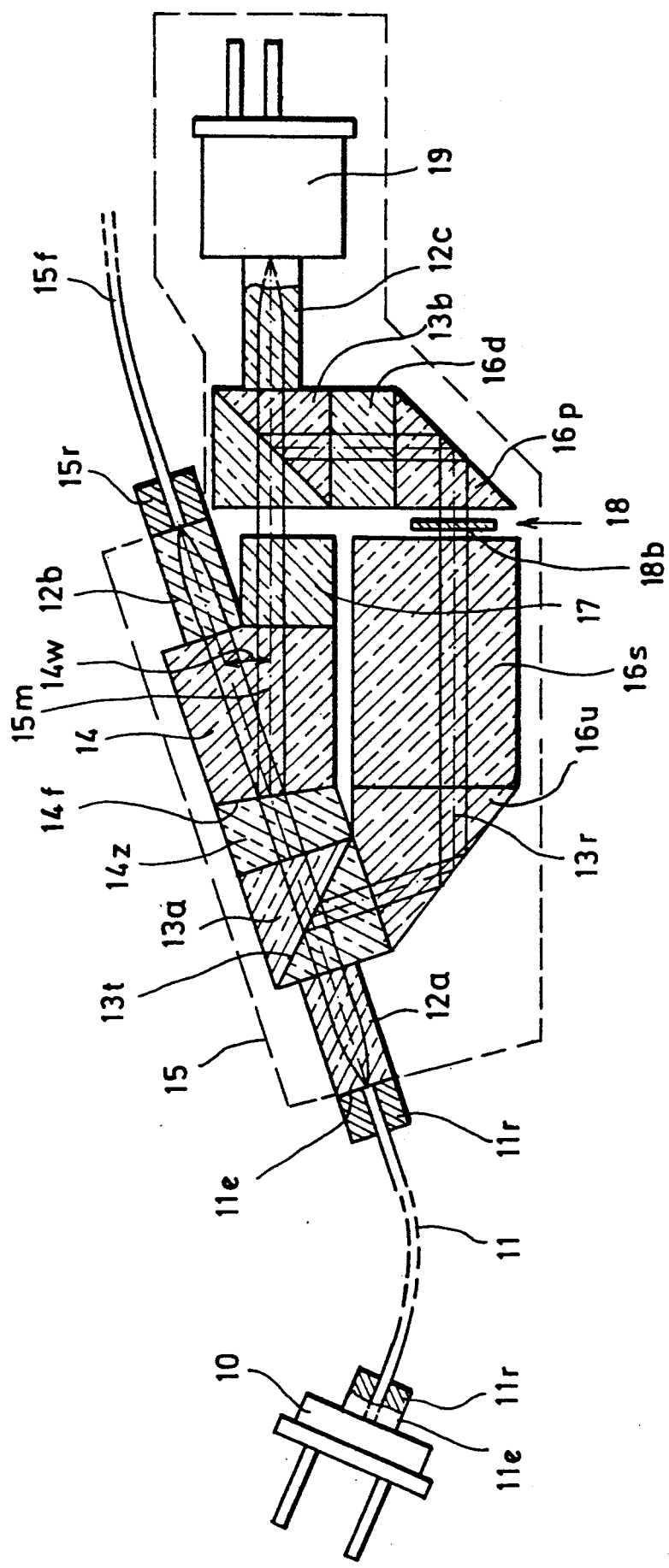
FIG. 1 is a schematic of an optical switch according to one embodiment of the invention wherein the radiation source is separated from the compact unit defining the switch; and, FIG. 2 is a schematic of an optical switch according to another embodiment of the invention wherein the radiation source is a component of the compact unit defining the switch.
Figure 2:
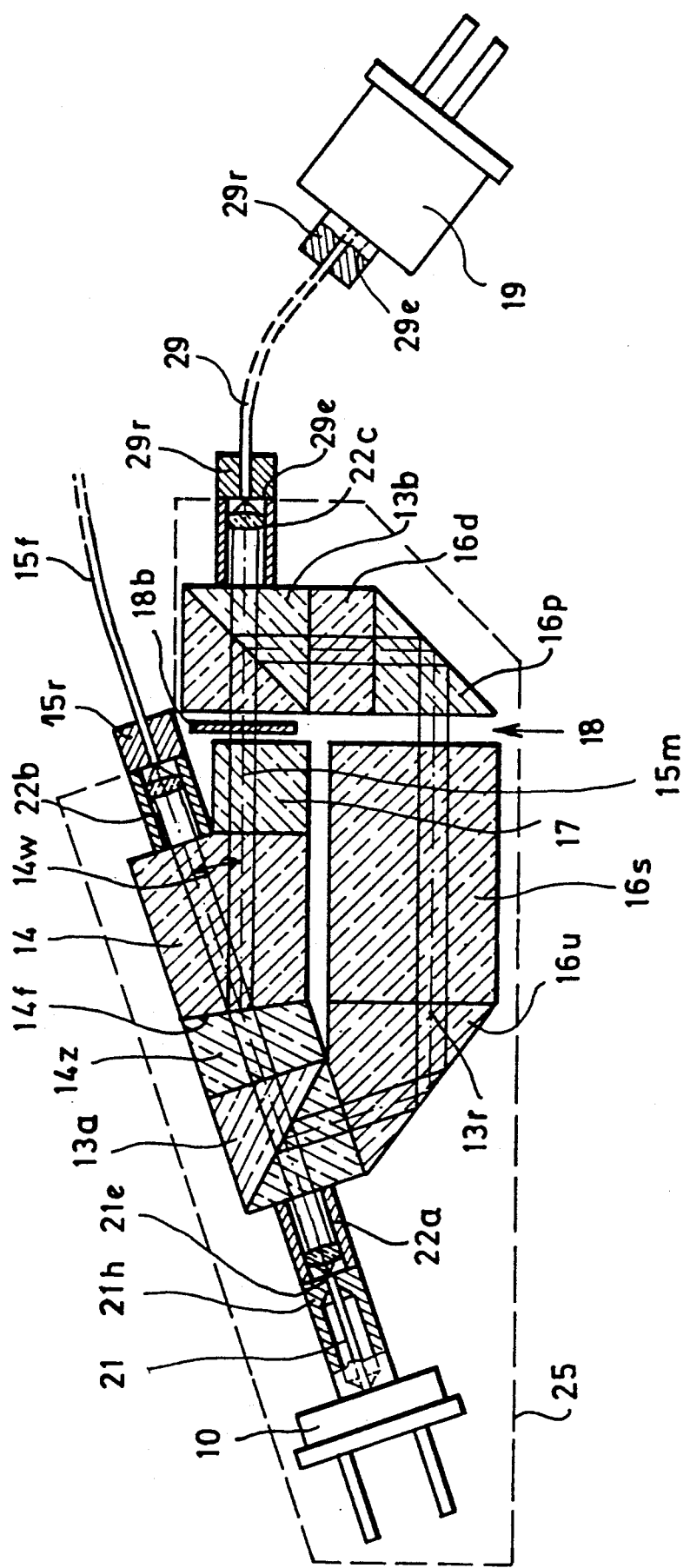

The embodiments shown in both FIGS. 1 and 2 operate to couple radiation emitted by the radiation source 10 into the front end of the fiber 15f leading to the sensor head and to conduct the measurement radiation returning from the fiber at a different wavelength to the receiver 19. Furthermore, it is intended that only intermittently a portion of the radiation emitted by the radiation source is conducted directly to the receiver 19.

In FIG. 1, the radiation source 10, for example a light-emitting diode, is connected via the fiber 11 with the optical switch configured as a compact unit 15. The ends of the fiber 11 are cemented into the tube pieces 11r having end faces 11e which are optically ground planar and polished together with the end faces of the fibers. The fiber 11 is seated with the tube piece 11r on an optical component 12a for collimation, for example, a GRIN-lens which collimates the radiation passing out of the end of the fiber.

A portion of the collimated beam is split off by the beam splitter 13a into a reference beam 13r with this portion being pregiven by the divider layer 13t of the beam splitter 13a. The reference beam 13r is conducted via the deflecting prisms (16u, 16p) and the spacers (16s, 16d) to a second beam splitter 13b.

The beam passed by the first beam splitter 13a travels through the glass parts (14z, 14). One of the glass parts has a face which abuts the other glass part. On this face of this one glass part, a suitable filter 14f, for example, a filter of dichroic layers, is mounted which has good transmissivity for the radiation of the radiation source 10. The radiation passed through the filter 14f is focused by the GRIN-lens 12b onto the front end of the fiber 15f going to the sensor head. The front end of the fiber 15f is likewise cemented into a tube piece 15r and can be cemented or seated with this tube piece onto the optical component 12b.

The radiation returning from the fiber 15f is collimated by the GRIN-lens 12b and impinges upon the filter 14f which has the largest possible reflection capacity for the wavelength of the returning radiation. The reflected component passes through the color glass filter 17 as measurement beam 15m and the filter functions to prevent stray light having the wavelength of the radiation emitted by the radiation source from reaching the receiver 19. In the second beam splitter 13b, the measurement beam 15m and the reference beam 13r are geometrically joined. The downstream GRIN-lens 12c focuses both beams onto the receiver 19.

The rays which otherwise always pass through the glass parts pass through an air gap 18 ahead of the second beam splitter 13b. A movable diaphragm 18b selectively interrupts the measurement beam 15m or the reference beam 13r in the air gap 18. This diaphragm can be configured, for example, as a motor-driven pivot diaphragm and its instantaneous position can be controlled by light barriers.

The air gap 18 notwithstanding, all parts disposed within the boundary line identified by 15 can be assembled into a compact unit in that these parts are mounted either on a common mounting plate or are connected by a glass part above or below the plane of the drawing.

Another embodiment is shown in FIG. 2 for connecting the radiation source 10 and receiver 19 to the optical switch. The radiation source 10 is a component of the compact unit here identified by 25. The radiation source 10 is connected with the optical component 22a for collimation via a fiber piece 21. This fiber piece 21 must be at least so long that it limits the radiation passing from its end 21e. The fiber piece 21 must have a length of at least one or several millimeters for a wavelength in the visible spectral range.

The fiber piece 21 is seated in a hollow body 21h which connects the light-emitting diode 10 with the optical component 22a for collimation. For a fiber having a diameter of, for example 220 μm, it is too complicated to bore a correspondingly long hole for the fiber in a holding part. For this reason, the holding part is configured as a hollow body put together from two parts wherein only the ends of the fiber are cemented and are machined and optically polished together with the end faces of the hollow body.

Not only GRIN-lenses are suitable as optical components for collimating and focusing. Another advantageous possibility are lenses or spheres which are seated in tubes having end faces machined so as to be plane parallel. This possibility is shown in FIG. 2 and identified by (22a, 22b, 22c).

FIG. 2 also shows that the receiver 19 does not have to be fixedly connected with the optical switch; instead, the receiver can be also connected via a fiber 29. The fiber is preferably likewise cemented into tube pieces 29r at its ends.

It is understood that also radiation source 10 and receiver 19 can form a compact unit with the optical switch and both can be likewise connected with the optical switch.

It is understood that the foregoing description is that of the preferred embodiments of the invention and that various changes and modifications may be made thereto without departing from the spirit and scope of the invention as defined in the appended claims.

What is claimed is:

1. An optical switch for conducting source radiation emitted by a radiation source into a fiber leading to a sensor and for conducting measurement radiation returning from the sensor through the fiber to an optoelectric receiver, the optical switch comprising:

a collimator component for receiving and collimating the source radiation;

a first beam splitter disposed downstream of said collimator component for passing a first component of said source radiation in the form of a transmitted beam and for splitting off a second component of said source radiation to form a reference beam;

a second component disposed downstream of said beam splitter for focusing said transmitted beam onto the fiber leading to the sensor and for collimating the measurement radiation returning from the sensor into a measurement beam;

filter means interposed between said collimator component and said second component for passing said transmitted beam and reflecting said measurement beam;

said filter means and said second component conjointly defining switch means for directing the reflected measurement beam toward said optoelectric receiver;

a second beam splitter disposed downstream of said switch means for receiving said measurement beam;

optical component means for conducting said reference beam away from said first beam splitter;

a second beam splitter for receiving said measurement beam from said switch means and said reference beam for geometrically superposing said reference beam onto said measurement beam and for passing said measurement beam and said reference beam to the optoelectric receiver;

air gap means interposed between said switch means and said optical component means on the one hand and said second beam splitter on the other hand; and, movable diaphragm means arranged in said air gap means for alternately interrupting said measurement beam or said reference beam.

2. The optical switch of claim 1, further comprising a fiber piece having an end face directed toward said collimator component and being mounted between the radiation source and said collimator component; and, said fiber piece having a length which is at least sufficient to limit the aperture of the source radiation passing from said end face.

3. The optical switch of claim 2, further comprising a hollow body for accommodating said fiber piece therein; and, said hollow body having plane-parallel end faces for connecting the radiation source with said collimator component.

4. The optical switch of claim 1, further comprising a fiber connecting the radiation source with said collimator; and, tube pieces mounted on the radiation source and said collimator; and, said fiber having ends cemented into said tube pieces, respectively.

5. The optical switch of claim 1, said filter means and said switch means being configured to reflect said measurement beam through an acute angle.

6. The optical switch of claim 5, said acute angle being less than 50°.

7. The optical switch of claim 1, said filter means being wavelength dependent so as to pass said transmitted beam having a first wavelength and so as to reflect said measurement beam having a second wavelength different from said first wavelength.

8. The optical switch of claim 7, said filter means including dichroic layers.

9. The optical switch of claim 8, further comprising color glass filter means interposed between said switch means and said second beam splitter.

10. The optical switch of claim 1, further comprising an optical focusing component mounted on said second beam splitter and the optoelectric receiver being optically connected to said optical focusing component.

11. The optical switch of claim 10, the receiver being connected directly to said optical focusing component.

12. The optical switch of claim 10, further comprising a fiber for interconnecting said optical focusing component and the receiver.

13. The optical switch of claim 10, said collimator component, said second component and said optical focusing component being respective GRIN-lenses.

14. The optical switch of claim 10, said collimator component, said second component and said optical focusing component each including a holder having plane-parallel end faces and a lens mounted in said holder.

15. The optical switch of claim 14, said lens having a spherical configuration.

* * * * *